L. B. SPERRY.
AUTOMATIC PILOT FOR AEROPLANES.
APPLICATION FILED MAR. 29, 1916.

1,415,003.

Patented May 2, 1922.
4 SHEETS—SHEET 1.

INVENTOR
LAWRENCE B. SPERRY

BY
Herbert H. Thompson
ATTORNEY.

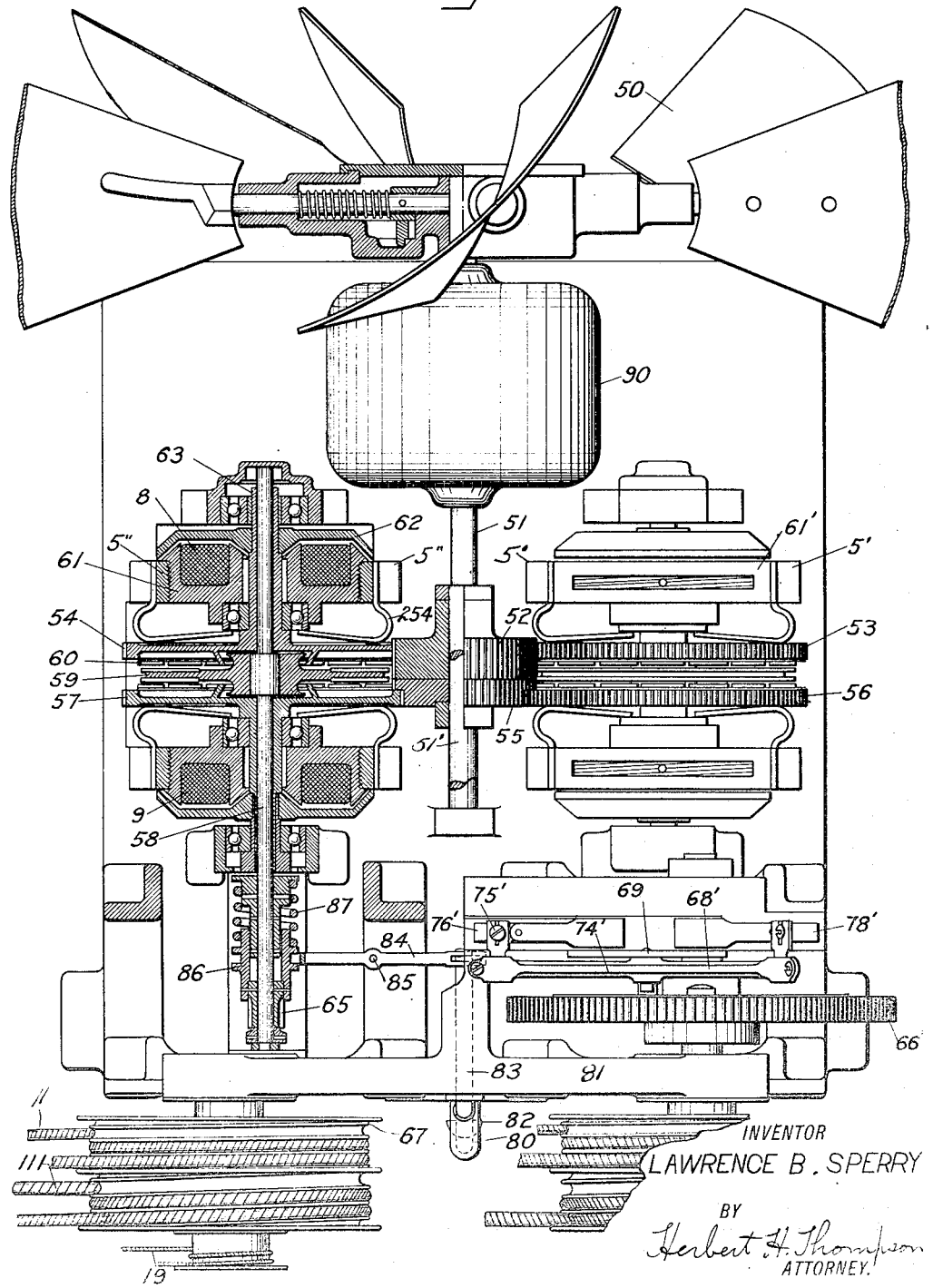

L. B. SPERRY.
AUTOMATIC PILOT FOR AEROPLANES.
APPLICATION FILED MAR. 29, 1916.
1,415,003.
Patented May 2, 1922.
4 SHEETS—SHEET 3.
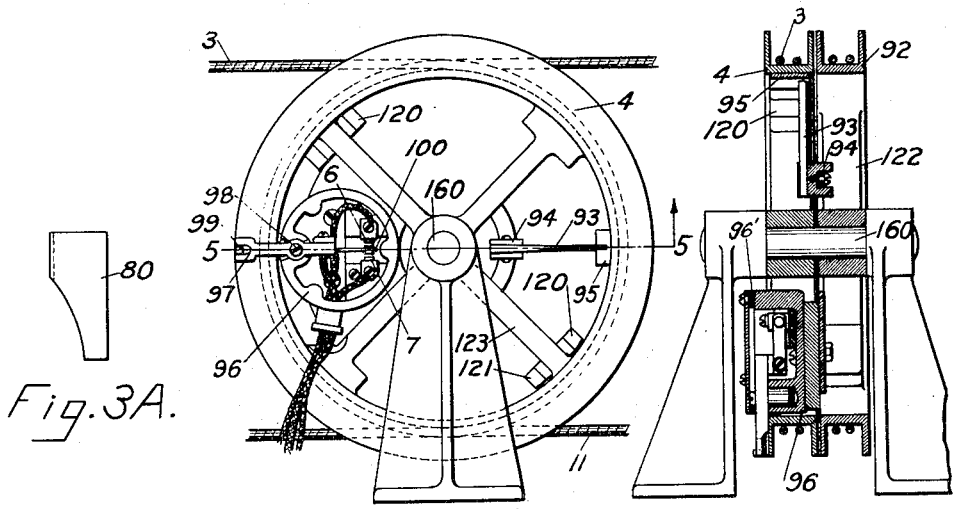
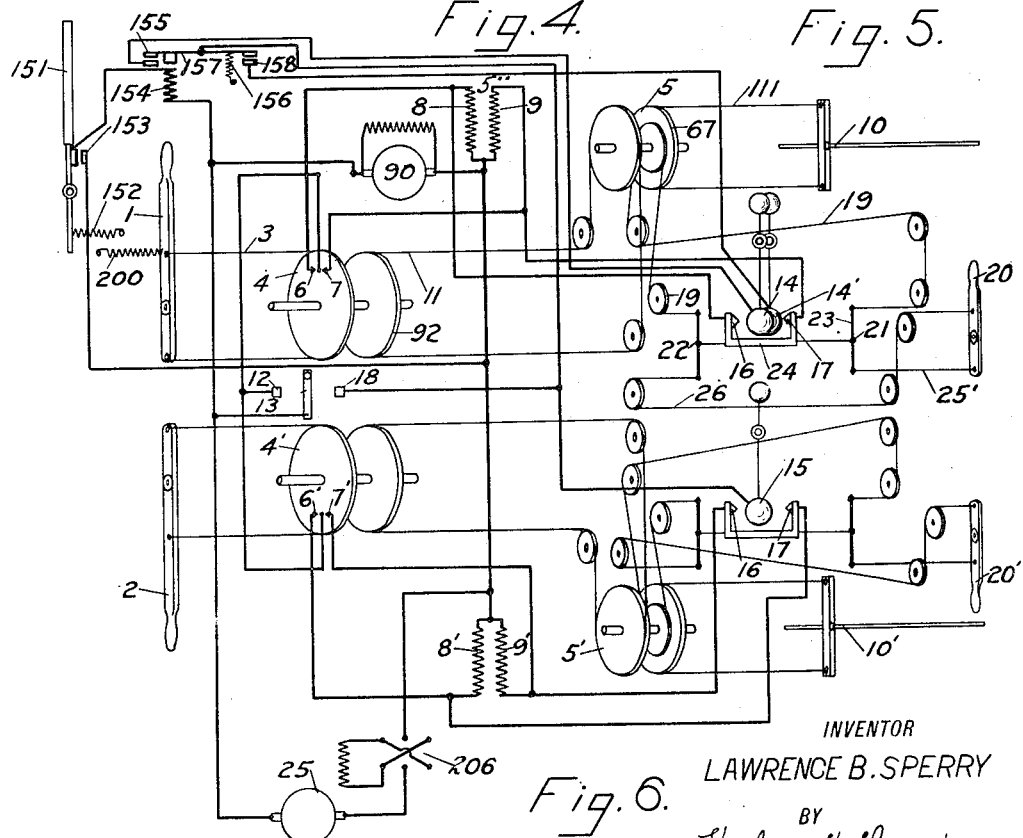
INVENTOR
LAWRENCE B. SPERRY
BY
Herbert H. Thompson
ATTORNEY.

L. B. SPERRY.
AUTOMATIC PILOT FOR AEROPLANES.
APPLICATION FILED MAR. 29, 1916.

1,415,003.

Patented May 2, 1922.
4 SHEETS—SHEET 4.

INVENTOR
LAWRENCE B. SPERRY
BY
Herbert H. Thompson
ATTORNEY.

UNITED STATES PATENT OFFICE.

LAWRENCE B. SPERRY, OF BROOKLYN, NEW YORK, ASSIGNOR TO THE SPERRY GYROSCOPE COMPANY, OF BROOKLYN, NEW YORK, A CORPORATION OF NEW YORK.

AUTOMATIC PILOT FOR AEROPLANES.

1,415,003.  Specification of Letters Patent.  Patented May 2, 1922.

Application filed March 29, 1916. Serial No. 87,434.

*To all whom it may concern:*

Be it known that I, LAWRENCE B. SPERRY, a citizen of the United States of America, residing at 1505 Albemarle Road, borough of Brooklyn, New York city, in the county of Kings and State of New York, have invented certain new and useful Improvements in Automatic Pilots for Aeroplanes, of which the following is a specification.

This invention relates to the control of aeroplanes, and its principal object is to devise a complete system of control adapted for all conditions, especially for the large aeroplanes in which the work required to move the control planes becomes very irksome. According to my invention, a plurality of methods for governing the aeroplane are combined into a single, compact, unitary system, so that the aviator may at his option employ any one of the several methods. Four methods are disclosed in this application, first, the direct manual control, second, automatic stabilization through a gyroscopic pendulum and servo-motor, third, semi-automatic stabilization through a gyroscopic pendulum and servo-motor, but under manual control, and fourth, indirect manual control through a servo-motor. Other objects will become apparent as the description proceeds.

Figures 1, 2:
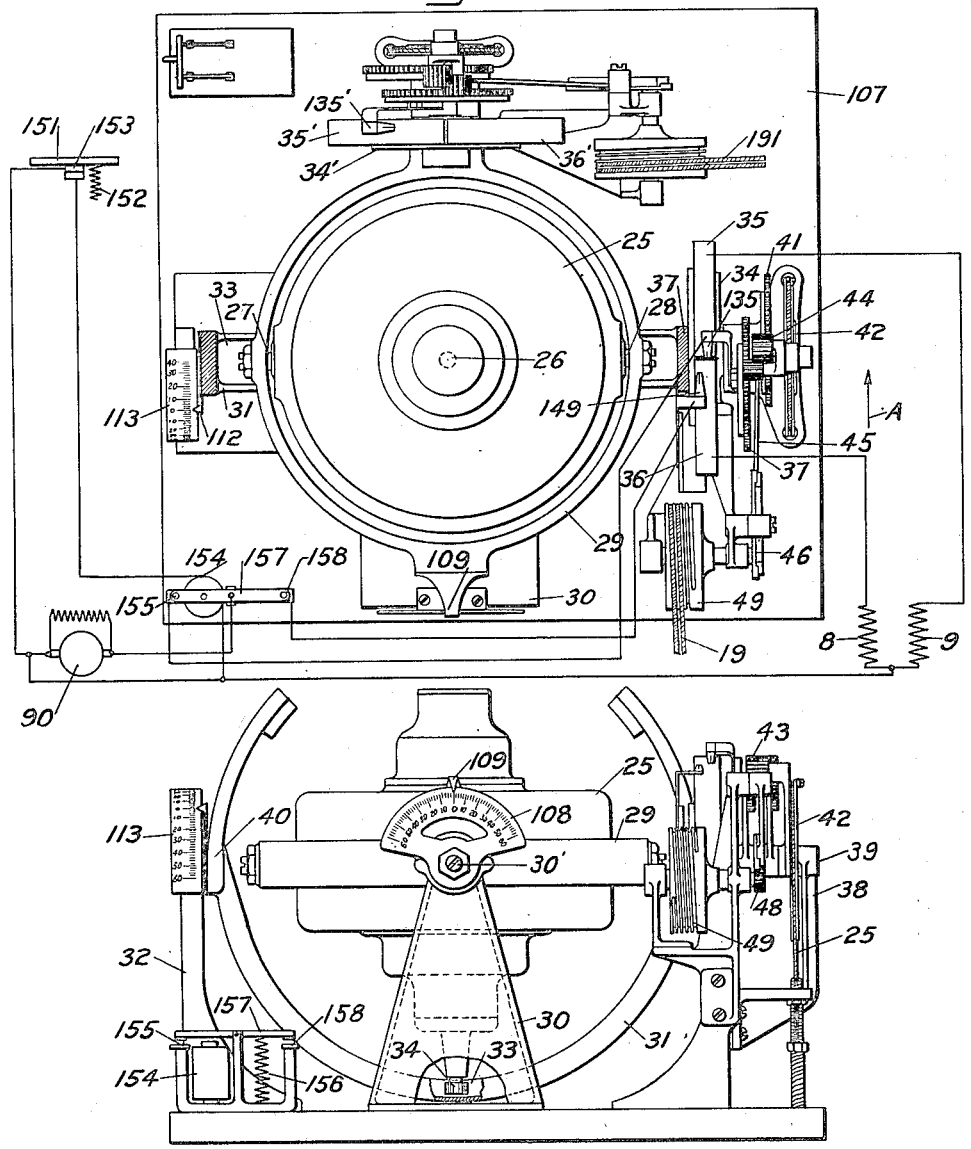
Figure 7:
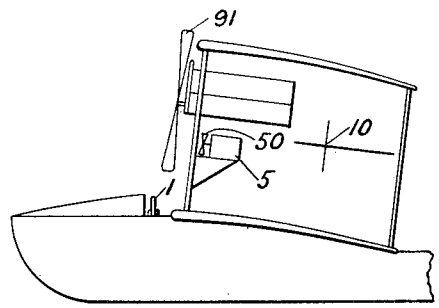
Figure 10:
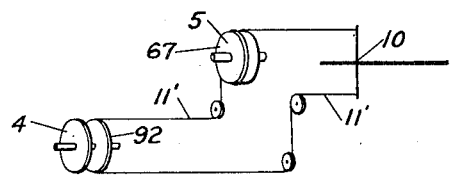
Figure 8:
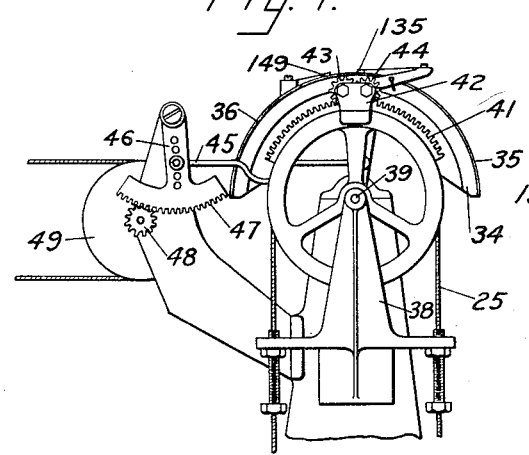
Figure 11:
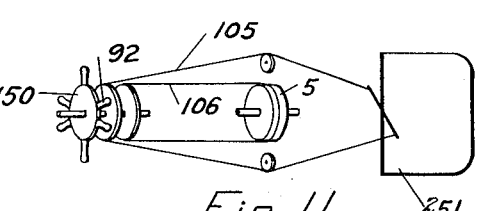
Figure 9:
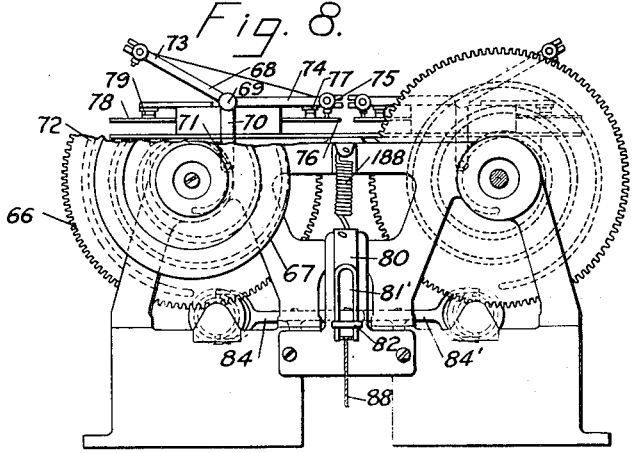

Referring to the drawings in which what I now consider to be the preferred forms of my invention are shown: Fig. 1 is a plan view of the gyroscopic unit used to control the stability of the aeroplane. Fig. 2 is an elevation thereof. Fig. 3 is a plan view partly in section of the servo-motor adapted to be used in conjunction with the gyroscopic unit for controlling the aeroplane. Fig. 3^A is a detail thereof. Fig. 4 is an elevation of an auxiliary control drum adapted for use in connection with the usual manual control means of the aeroplane. Fig. 5 is a section thereof on line 5—5, Fig. 4, Fig. 6 is a diagrammatic view showing the general plan of my complete system for the control of the aeroplane. Fig. 7 is a diagrammatic end elevation of an aeroplane showing the preferred position of the servo-motor. Fig. 8 is an end elevation of a portion of Fig. 1. Fig. 9 is an end elevation on a smaller scale of the servo-motor shown in Fig. 3. Figs. 10 and 11 are diagrammatic views showing modifications of a portion of the system shown in Fig. 6.

Taking up first the invention in its broadest aspect, reference will be had to Fig. 6. In this Fig., 1 and 2 represent the ordinary means employed on aeroplanes to actuate directly the lateral and longitudinal stabilizing planes of an aeroplane. Mechanically connected with each device, as by wires 3, is a controller 4. The controller is adapted to control a servo-motor 5, as by means of contacts 6 and 7 which excite solenoids or electro-magnets 8 and 9 on the servo-motor. The servo-motor is directly connected to the stabilizing planes 10 through wire 111. A follow-up connection 11 is also provided between the servo-motor and the controller, which also serves as a means for actuating the control planes 10 directly from handle 1, when the servo-motor fails to operate or when it is cut out by means of switches 12, 13 as will be hereinafter more fully explained. In this Fig. the compound, long period pendulums 14, 15 represent the gyroscope of the other Figs., one pendulum being shown for each control. On tilting of the aeroplane, one or the other of contacts 16 or 17 are completed through the pendulum 14. These contacts are adapted to be thrown in circuit with the same servo-motor 5 by means of switch 13, 18 so as to control planes 10 and the stability of the aeroplane. A follow-up connection 19 from the servo-motor to the contacts is provided. In order that the aeroplane may be under the control of the aviator while being automatically stabilized, I provide a manual means 20 for adjusting the position of contacts 16 and 17. Handle 20 and the follow-up connection 19 are connected to the contacts through differential connections 21, 22, which in this Fig. are represented as levers 23 connected at their middle points to the support 24 for the contacts and secured near one end to one of wires 19 and near the other end to a wire 25', or 26 coming from handle 20. By this means the position of the contacts is the resultant of the position of control handle 20 and of the stabilizing plane 10.

Having taken a general survey of the invention the preferred construction of the parts will now be described in greater detail. The gyroscopic pendulum shown in Figs. 1 and 2 is adapted to control the aeroplane about both horizontal axes. The gyroscope's rotor preferably forms an integral part of an electric motor 25, the spinning axis 26 being normally vertical. The motor casing is pivoted on horizontal trunnions 27, 28 to a gimbal ring 29, which in turn is pivotally supported by brackets 30. If an aeroplane were headed in the direction of the arrow A (Fig. 1), it will readily be seen that the relative tilting of ring 29 about pivots 30' and the aeroplane may be used to bring into action forces to control the stability of the aeroplane about the fore and aft axis. In order to control the stability about the transverse axes, I make use of a loop 31 pivoted on brackets 32. The loop is preferably provided with a channel section 33, in which channel a roller 34' secured to the rotor casing 25 is confined. Mounted near and fixed to the pivotal axes of both ring 29 and loop 31 is a semi-circular contact segment 34, 34' on which a brush 135, 135' is adapted to slide. A pair of contact strips 35, and 36 separated by an insulated strip are mounted on segment 34, so that when the aeroplane tilts the brush will move onto one or the other of strips 35 or 36. Preferably the brush is not secured rigidly to the aeroplane, but is mounted on a gear segment 37, which is pivoted on an arm 38, extending from bracket 32 about an axis 39 in line with the pivotal axis 40 of loop 31. (See Fig. 8.) A second gear segment 41 and an arm 42' on pulley wheel 42 carrying a pair of intermeshing pinions 43, 44, are pivoted on the same axis. The wire 25' passing over the said pulley 42 is connected to a control handle 20. The segment 41 is connected through a link 45 to an arm 46 provided with a gear sector 47 with which a pinion 48 meshes. A drum 49 is secured to the same shaft as pinion 48, so that the motion of wire 19 forming the follow-up connection from the servo motor 5 is communicated to segment 41. Pinion 43 not only meshes with pinion 44 but also with segment 37. It will thus be seen that a differential connection between the hand control, the position of the aeroplane and the position of the control planes is secured, which is the equivalent of the simplified construction shown in Fig. 6. In Fig. 1, however, the reversing contacts are shown as mounted on the gyroscopic pendulum, while in Fig. 6 these contacts are mounted on the aeroplane, thus illustrating one of the many obvious modifications in detail of which my invention is capable. The longitudinal control system is preferably a duplicate of the lateral, as illustrated, brush 135' cooperating with contacts 35' and 36' secured to gimbal ring 29. As will be readily understood, the servo motor clutches are actuated by the relative tilting between the aeroplane and the gyroscopic pendulum about either the axis of the loop 31 or gimbal ring 29 or both. Tilting the aeroplane forwardly about the transverse axis, for instance, will cause brush 135 to move on the contact 36 and thus complete the circuit through coil 9 to actuate the elevating rudder 10. Since it is dangerous to allow the aeroplane to fall below its critical speed, even when it is under the control of an automatic stabilizer, I prefer to provide means for automatically volplaning the aeroplane when such conditions arise so that the normal speed of the aeroplane may be regained without interference from the aviator. For this purpose I may provide an auxiliary brush or contact 149 positioned to bear on contacts 35, 36 or other contacts similar thereto, but this brush is preferably positioned with reference to the other contacts at an angle to the normal position of brush 135 about equal to the angle between the normal position of the aeroplane during flight, and its preferred inclination for volplaning. This brush is normally not in circuit with the servo motor, but I provide means responsive to the velocity of the aeroplane through the air to throw this brush into circuit with the servo motor and the other brush out of circuit. This means may consist of any form of contact making anemometer, such as a vane 151, which is normally held in an approximately vertical position facing the front of the aeroplane (see also Fig. 6). A contact 153 is normally maintained in a closed position by the pressure of the air acting on vane 151, but when the pressure of the air on the vane falls below a predetermined amount, the tension of the spring 152 overcomes the pressure of the air and contact 153 is opened. An electromagnet 154 is in circuit with said relay and serves to normally hold closed a contact 155. When, however, contact 153 is broken, the spring 156 acting on the pivoted armature 157 breaks the contact 155 and makes a second contact 158. The former contact is in circuit with brush 135 while the latter is in circuit with brush 149, so that it will be seen that when the velocity of the aeroplane falls below the critical speed, the control of the aeroplane will be changed from the substantially vertical brush 135 to the inclined brush 149 so that the aeroplane will be automatically volplaned at a predetermined angle. It should also be noted that the control is taken out of the aviator's hand by this change of brushes, since brush 149 is fixed and not connected to handle 20. In the diagrammatic showing of Fig. 6, in which the common return wire is shown as leading to the pendulum instead of to an adjustable brush on a fixed part, this condition is represented by an auxiliary pendulum 14', placed to one side of pendulum 14 and in circuit with contact 158.

In addition to the use of the gyroscopic pendulum to control the stability of the aeroplane directly, it also furnishes an excellent inclinometer for the aviator. For this purpose suitable scales are affixed about the two axes of the gyroscope, which are preferably made so as to be read from one position. As shown, an angular scale 108 is fixed to bracket 30, while a pointer 109 fixed to gimbal ring 29, is arranged to move over the said scale, thus furnishing an indication of the tilting of the aeroplane about the fore and aft axis. For indicating inclination about the transverse axis I mount a pointer 112 upon loop 31 the scale for which is marked upon a suitable cylindrical surface fixed to bracket 32, so that both scales may be read from the aviator's seat. When the aviator is controlling the machine either directly or indirectly through the servo motor from handles 1 and 2, the inclinometer scales prove a very useful adjunct.

A preferred form of servo motor is shown in Fig. 3. It is preferably a wind motor or wind mill, the application of power being controlled by electro-magnetic clutches in circuit with the contacts on the gyroscopic pendulum described above. The wind mill proper is shown at 50 and is mounted on a shaft 51. A pinion 52 is secured to said shaft and meshes with large gears 53 and 54 and with another pinion 55 mounted directly below pinion 52 on shaft 51'. Pinion 55 meshes with large gears 56 and 57 which gears are hence driven in opposite directions to gears 53 and 54 respectively. The two clutch members 5'' and 5' are preferably duplicates, so that only one will be described in detail, one being used for the lateral while the other is used for longitudinal control. The gears 54 and 57 are loosely mounted on a shaft 58, and between them is a friction disc 59 which is secured to said shaft. Each gear is provided with a clutch face 60 adapted to operate with the opposite faces of the disc 59. A winding 8 is placed within the casing 61 and is adapted upon being excited to attract the armature 62, which is secured to a sleeve 63, forming an extension of gear 54, so that the gear 54 is forced into frictional engagement with the disc 59 against the action of springs 254 when said winding is excited. The corresponding winding 9 actuates through a similar means the gear 57, so that the shaft 58 may be driven in either direction depending upon which winding is excited. Mounted near one end of the shaft 58 is a pinion 65 which meshes with a large gear 66 secured to the same shaft as a winding drum 67 from which wires 111 lead to the control plane 10. Preferably a follow-up wire or wires 19 lead from the servo motor back to the drum 49.

In order to prevent the servo motor from throwing the control planes beyond the limit of their movement, I may provide an automatic cut-out switch preferably in the form of a bell crank lever 68 pivoted to 69. The downwardly extending arm 70 from said lever (see Fig. 9) carries a pin 71 which engages a spiral groove 72 in the face of gear 66, so that the angular position of the bell crank lever bears a predetermined relation to the number of revolutions in either direction made by the servo motor. In its middle or normal position the two arms 73 and 74 of the lever are preferably at equal angles to the horizontal, but when the gear 66 is revolved in a counter clockwise direction, in Fig. 9, arm 74 is brought down to the position indicated in said Fig. so that the pin 75 on said lever will strike the flexible contact strip 76 and break the servo motor circuit at 77. Similarly arm 73 is brought into contact with strip 78 to break contact 79 upon rotation of the gear in a clockwise direction.

I also preferably provide a safety device adapted to disconnect the servo motor at the will of the aviator. This may comprise a wedge shaped member 80 (Figs. 3, 3$^A$ and 9) mounted on the bracket 81 and having a slot 81' extending upwardly from its lower end. Wedge 80 is adapted to engage the T shaped head 82 of link 83 so that upon drawing the wedge downwardly link 83 is moved outwardly. Adjacent its inner end said link is secured to a pair of levers 84 and 84' extending in opposite directions and pivoted at 85. Lever 84 rotatively engages collar 86 secured to pinion 65, so that upon said outward movement of link 83 pinion 65 will be withdrawn from engagement with gear 66. A spring 87 may be provided to return the pinion 65 to its normal position upon release of the wedge. A wire 88 may extend from the wedge to a convenient position near the aviator for actuating the wedge, a spring 188 being adapted to return it to its normal position.

As above stated electrical means are preferred to drive the gyroscope and also to actuate the clutches. In order to furnish a supply of electricity for these purposes and also for any other of the many purposes to which electricity may be applied on aeroplanes, such as operating signal lights, small wireless telegraphic sets and the like, I prefer to employ a generator 90 driven by means of a wind motor, preferably the same wind motor which is used to actuate the servo motor. As shown in Fig. 3 generator 90 may be mounted directly on shaft 51 of the servo motor. It may readily be appreciated that it is very desirable to start the gyroscope before the aeroplane leaves the ground or is even released, so that the automatic control system may be in complete operation by the time the aeroplane is in the air. I therefore prefer to mount wind mill 50 directly behind the propeller 91 of the aeroplane so that it can be actuated as soon as the aeroplane engine is started, thus furnishing a reliable supply of electricity at the time the aeroplane engine is being tuned up for a flight. In addition, this location of the wind mill increases its power in flight, since as is well known, the air immediately behind the propeller travels past the aeroplane at a much greater velocity than the still air on either side of the propeller. For the above mentioned location, a tractor type aeroplane is of course preferable.

The details of the controller by means of which the aeroplane may be controlled either directly from the usual manual control devices or indirectly through the same devices and the servo motor, as shown in Figs. 4 and 5. The wire 3 coming from the hand lever is wrapped around a drum 4 mounted on shaft 160. Also mounted on said shaft is a second drum 92 on which is preferably wound a wire 11 leading directly to the servo motor 5. The two drums are mechanically connected through a lost motion device which is shown as a plurality of pairs of spaced lugs 120, 121 projecting from spokes 122 of drum 92, which lugs are adapted to engage spokes 123 of drum 4. In order to resiliently centralize the two drums, I make use of a leaf spring 93, secured adjacent one end by means of clamp 94 to drum 92 and having its other end engaging a recess in a block 95 secured to drum 4. Also secured to drum 92 is a housing 96 which carries a member 97 pivoted to the housing at 98. One end of said member 97 is shown as forked and engages over the pin 99 on drum 4, while the other end carries a resilient contact strip 100 adapted to engage upon rotation of said member either one or the other of fixed contacts 6 or 7 which are secured within the housing 96. This casing is preferably made water-tight as by packing 96'.

It will thus be seen that when servo motor 5 is thrown into circuit with the contacts 6 and 7 by means of switch 12 and 13 that the movement of handle 1 will impart a slight relative movement to drums 4 and 92 against the action of spring 93, thus completing a circuit through one or the other of the contacts 6 or 7 and actuating the servo motor to move the control planes. At the same time the follow-up connections 11 from the servo motor to drum 92 will move it so as to cause it to follow the movement of drum 4. The result is that the hand lever 1 may be moved exactly as if the aviator were moving the planes himself and not though the aid of the servo motor. Moreover, when the said contacts are cut out, the aviator may still move the handle 1 as before and control the planes directly, since the lost motion between the two drums permitted by lugs 120 and 121 is relatively so slight as to be negligible. The follow-up wire 11, it may be noted, will then act as a means for directly connecting the hand lever with the control plane. The fact that the wires still lead through the servo motor does not add materially to the work of controlling the planes since the parts of the servo motor moved by manual operation are very slight and easily moved, when the servo motor clutches are not excited. It may also be noted that the servo motor may be mechanically as well as electrically cut out by means of wedge 80 as described.

In the indirect system of control in which a reference line or plane is used to govern the stability of an aeroplane, it is frequently found that the servo motor will be continually actuated in first one direction and then the other, causing excessive wear and tear on the whole machine. I have found that this condition is primarily due to the fact that the automatic stabilizer is not properly adjusted or synchronized to the machine, and that it may be easily overcome by exerting a constant yielding pressure on the control plane in the proper direction. In my system of control this may be accomplished by connecting a spring 200 to the control handle 1, since even when the aeroplane is under automatic control, handles 1 and 2 are still connected to the control planes 10 and 10' so that they move with them in the same manner as when moved by the aviator. Incidentally this last mentioned feature proves valuable in training aviators, since he thereby becomes familiar with the movements that should be given the control handles for all conditions.

Figs. 10 and 11 show two of the many modified methods of connecting the controller 4 with the servo motor and control planes. Referring to Fig. 10, but a single wire 11' is used to connect the drum 92 and the control plane 10, the wire being wound around the servo motor drum 67 as it passes to the control plane, and running directly from the plane 10 to the drum 92 on its return from the control plane. In Fig. 11 a wire 105 leads directly from the drum 92 to the control plane 251, and return, while a second wire 106 leads to the servo motor 5 and return. It will readily be seen that the same result is achieved in both cases as in Fig. 6, but that the use of a separate and distinct follow-up wire is eliminated, while retaining an equivalent follow-up connection. Fig. 11 is also designed to illustrate another use to which the controller and servo motor system may be put, i. e., for steering the aeroplane. In this figure 150 indicates the usual steering wheel and 251 the vertical rudder. It will be evident, therefore, that with my system, the aviator may be relieved of substantially all the work involved in controlling and steering the aeroplane.

To summarize briefly the operation of my invention, the entire control system becomes energized upon the starting of the engine, since the wind mill is placed behind the propeller. To illustrate the various uses to which my control system is adapted let us suppose that the aviator prefers to have the machine under direct hand control, while it is rising into the air. Switch 13 would then stand in the position shown in Fig. 6. After a short flight, the aviator may become tired, if the machine is heavy, when he may relieve himself of the major portion of the work and still retain manual control through the regular controls, by throwing switch 13 into contact with 12. The servo motor will then be under the control of the follow-up controllers 4, 4'. During this time the gyroscope furnishes a very reliable inclinometer for the aviator. Then he may throw the switch 13 into contact with 18 when the automatic stabilizer will be thrown in. The aviator does not lose control entirely thereby, but may still govern the machine by means of the auxiliary handles 20, 20'. If the machine should fall below the critical speed, it would be automatically volplaned, as explained. If the aviator should desire to ascend or descend in spirals, he should see that the reversing switch 206 is in the proper position.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Thus, while I have spoken of the control planes of an aeroplane as distinct planes, I wish it to be understood that I use this term generally to include all types of stabilizing devices such as rudders, ailerons, flexible wing tips and the like.

Having described my invention, what I claim and desire to secure by Letters Patent is:—

1. In an aeroplane, the combination with a direct manual control device, an automatic governor and a stabilizing plane, of a servo-motor adapted to be controlled from said governor, connections between said plane, said motor and said device, a controller for said motor associated with said device, and means whereby the governor may be rendered inoperative.

2. In an aeroplane, the combination with a manual control device, an automatic governor and a stabilizing plane, of a servo-motor adapted to be controlled from said governor, connections between said plane, said motor and said device, a controller for said motor associated with said device, and means for connecting either said controller or said governor to said motor whereby said plane may be operated either directly from said device or through the servo-motor from said device or said governor.

3. In an aeroplane, the combination with a stabilizing means and an electric servo-motor therefor, of a control means for said motor comprising a manually controlled member, a second member having a follow-up connection with the stabilizing means connected to said first member through a lost motion device, cooperative contacts adapted to be operated by slight relative movement of said members for controlling said motor, and means for rendering said contacts inoperative, whereby said stabilizing means may be operated from said manual member either directly or through the servo-motor.

4. In an aeroplane, the combination with the usual manual control devices and stabilizing planes, of a fluid operated servo-motor, a gyroscopic pendulum, contacts controlled by said pendulum for governing said servo-motor, a second set of contacts operated by said manual devices for governing said servo-motor, and means rendering either one or the other of said contacts operative.

5. In an aeroplane, the combination with the usual manual control devices and stabilizing planes, of a fluid operated servo-motor, a pendulous device, contacts controlled by said pendulum for governing said servo-motor, a second set of contacts operated by said manual devices for governing said servo-motor and auxiliary manual control means for adjusting said pendulum contacts, whereby the stability of the aeroplane may be controlled through the servo-motor either directly or through the said pendulum.

6. In a tractor aeroplane, the combination with the engine and propeller, of a wind motor mounted in the stream of the propeller, a generator driven by said motor, and a motor-gyroscope in circuit with said generator.

7. In an aeroplane, the combination with the engine and propeller, of a wind motor mounted in the stream of propeller, a generator driven and a shaft driven by said motor, a motor-gyroscope in circuit with said generator and electro-magnetic means in circuit with said generator and governed by said gyroscope for coupling said shaft to the aeroplane stabilizing means.

8. In an aeroplane, a wind motor mounted thereon, a generator driven and a shaft driven by said motor, a motor-gyroscope in circuit with said generator and electro-magnetic means in circuit with said generator and governed by said gyroscope for coupling said shaft to the aeroplane stabilizing means.

9. The combination with an aeroplane, of a gyroscopic pendulum mounted thereon, a servo-motor, contacts on the pendulum and aeroplane adapted to actuate the servo-motor for maintaining the aeroplane on an even keel, an additional contact, adapted upon being excited to volplane the aeroplane, and means responsive to the relative velocity of the air for cutting out said first contact and exciting said second contact.

10. The combination with an aeroplane, of a gyroscopic pendulum mounted thereon, a plurality of contacts adapted to be relatively moved upon a change in the relative inclination of the aeroplane and pendulum and positioned so as to cause the aeroplane to assume different angles of incidence, and a servo-motor adapted to be thrown into circuit with one or another portion of said contacts, whereby the angle of flight may be varied.

11. The combination with an aeroplane, of a pendulous device mounted thereon, a plurality of contacts adapted to be relatively moved upon a change in the relative inclination of the aeroplane and pendulum, a servo-motor, and means responsive to the velocity of the aeroplane for placing the servo-motor under the control of predetermined portions of said contacts.

12. In an aeroplane, the combination with the usual manual control device and a control plane connected thereto for directly governing the aeroplane about an axis, of a pendulous member, a servo-motor also connected to the control plane, means for controlling said motor from said member, and means for controlling said motor from said device.

13. In an aeroplane, the combination with a manual control device and stabilizing plane, of a wind motor, a generator and an electrically controlled servo-motor driven thereby, said motor being in circuit with said generator and being connected to said stabilizing plane, means operated by said manual device for governing the servo-motor, and an electrically driven gyroscopic inclinometer also in circuit with said generator.

14. In an aeroplane, the combination with a manual control device and a stabilizing plane, of a double acting servo-motor, a pendulous device for controlling the servo-motor, connections between the manual device, the stabilizing plane and the servo-motor, and means for exerting a constant pressure on the stabilizing plane whereby hunting is prevented.

15. In an aeroplane in combination, a stabilizing plane, a hand lever, a set of contacts controlled thereby, a servo-motor, a pendulous device, a connection between said plane and lever whereby the latter may operate the former directly, a connection between said servo-motor and plane, a set of contacts controlled by said pendulous device and means whereby said servo-motor may be energized through either set of contacts.

16. The combination with a dirigible device, of gyroscopic means for controlling the same, a plurality of contacts adapted to be relatively moved upon relative turning of the aeroplane and said gyroscope about an axis, a servo-motor normally controlled from a predetermined portion of said contacts, and means for connecting said motor to another portion of said contacts for altering the effective relation between the gyroscope and aeroplane.

17. The combination with an aeroplane, of a gyroscopic pendulum mounted thereon, a plurality of contacts adapted to be relatively moved upon a change in the relative inclination of the aeroplane and pendulum about a transverse axis and a servo-motor adapted to be thrown into circuit with one or another portion of said contacts, whereby the angle of flight may be varied.

18. In a flying machine, the combination of automatic means for maintaining a predetermined angle of flight including a contact and a servo-motor normally controlled therefrom, manual means for moving said contact to steer the machine in the vertical, a second fixed contact, and means responsive to the condition of flight of the machine for placing the servo-motor under the control of the second contact to cause descent of the machine.

19. In a flying machine, the combination of automatic means for maintaining a predetermined angle of flight including a contact and a servo-motor normally controlled therefrom, a second contact, and means responsive to the velocity of the machine for placing the servo-motor under the control of the second contact to cause descent of the machine.

In testimony whereof I have affixed my signature.

LAWRENCE B. SPERRY.